United States Patent [19]

Löfman et al.

[11] 4,429,319
[45] Jan. 31, 1984

[54] METHOD AND APPARATUS FOR REGISTERING A TIME-DEPENDENT QUANTITY TO BE MEASURED

[76] Inventors: Olof B. G. Löfman, Banvägen 21B; Carl O. Löfman, Högbergavägen 18, both of Lidingö, Sweden

[21] Appl. No.: 354,085
[22] PCT Filed: Jun. 26, 1980
[86] PCT No.: PCT/SE80/00178
    § 371 Date: Feb. 3, 1982
    § 102(e) Date: Feb. 3, 1982
[87] PCT Pub. No.: WO82/00055
    PCT Pub. Date: Jan. 7, 1982

[30] Foreign Application Priority Data

Dec. 17, 1978 [SE] Sweden ............................ 7813329

[51] Int. Cl.³ ............................................. G01D 9/42
[52] U.S. Cl. .............................................. 346/108
[58] Field of Search ........................... 346/107, 108

[56] References Cited

U.S. PATENT DOCUMENTS

| | | | |
|---|---|---|---|
| 3,091,506 | 5/1963 | Brown et al. | 346/107 |
| 3,173,745 | 3/1965 | Stone et al. | 346/107 |
| 3,401,400 | 9/1968 | Lindsey | 346/108 |
| 3,427,631 | 2/1969 | Donald | 346/108 |
| 3,438,057 | 4/1969 | Neitzel | 346/107 |
| 3,545,564 | 12/1970 | Barber | 181/0.5 |
| 3,988,742 | 10/1976 | Meier et al. | 346/107 R |

FOREIGN PATENT DOCUMENTS

| | | |
|---|---|---|
| 1497739 | 9/1967 | France . |
| 456616 | 11/1936 | United Kingdom . |
| 1497444 | 1/1978 | United Kingdom . |

Primary Examiner—Donald A. Griffin
Attorney, Agent, or Firm—Burns, Doane, Swecker, & Mathis

[57] ABSTRACT

Dosimetric data are registered in several channels as a directly readable bar chart, the height of the readable registration of each respective bar being a direct measure of the integrated dose value of the associated channel. Preferably, the registration is made by means of a measurement signal transducer (1) and a measurement interval separator (3) connected thereto, the separator controlling a number of parallel registration channels, each of the channels including a LED (10–13), a film (28) for integrating registration of radiation emitted by the LED, a slot-shaped aperture opening (34–37) for providing a bar-shaped incidence of radiation flow on the film, and a wedgy grey filter (30–33) attanuating the radiation intensity of the flow striking the film stepwise or continuously in the direction of the bar.

8 Claims, 4 Drawing Figures

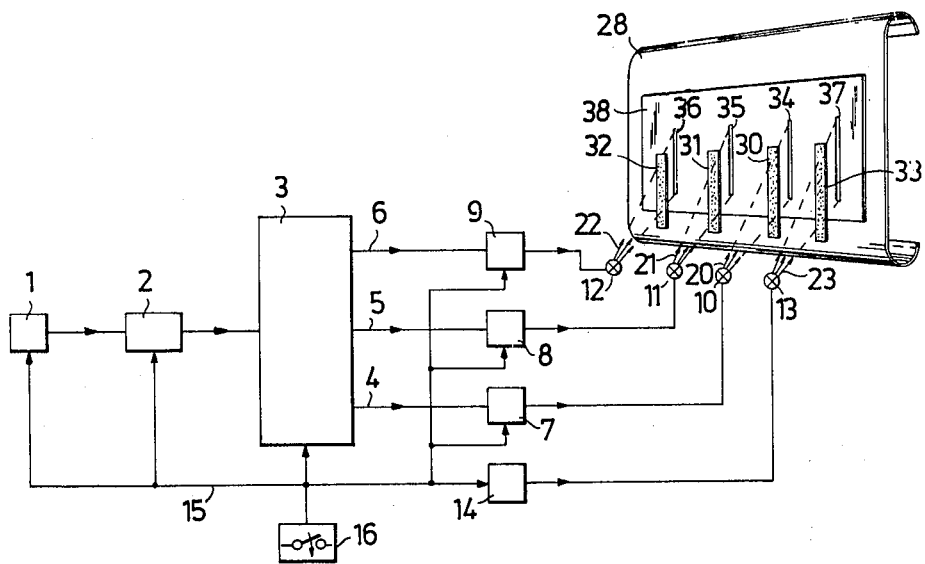
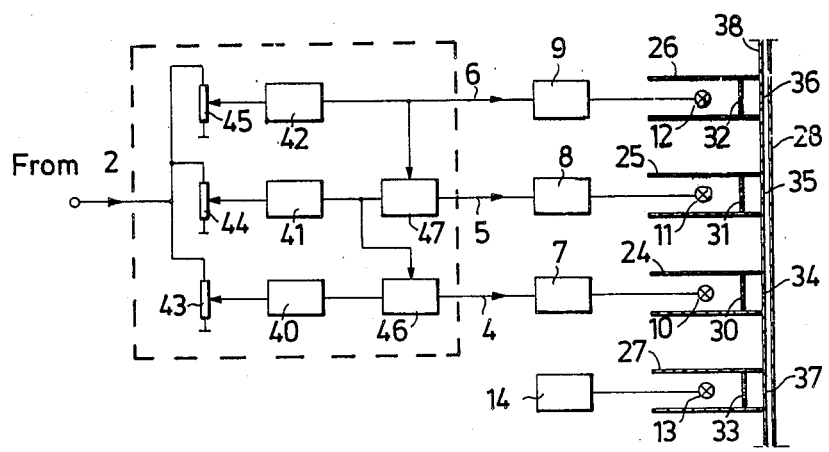
Fig. 2

METHOD AND APPARATUS FOR REGISTERING A TIME-DEPENDENT QUANTITY TO BE MEASURED

TECHNICAL FIELD

The present invention relates to the registration or recording of a measured quantity, which is time-dependent, and which is present in the form of an electrical signal, the registration being of the kind including conversion or transformation of the signal to an emission or radiation flow, with detection and integrating registration of thus generated emission by means of an element sensitive to said emission, said element thus being given a subsequently readable, integrated measurement value registration corresponding to a time function of the quantity to be measured. The obtained measurement value registration can especially represent an exposure dose.

BACKGROUND ART

Registration of the kind mentioned above is already known, e.g. from the Swedish patent No. 7413396-8. This publication describes a so-called audio or noise dosimeter, which includes a microphone transmitting an electrical signal in response to sound picked up by it, said signal being supplied to two parallel light-emitting diode (L.E.D.) circuits after filtering and amplification. Each circuit has a LED, which is energised for emitting light when the input signal to the circuit is within a given interval corresponding to a given sound level interval. Each LED has allotted to it a given portion of a photographic film, where the emission flow of the associated LED is detected and integratingly recorded as a film darkening. After a recording process, which may include an arbitrary time period, either continuous or comprising partial periods, the film will accordingly carry a number of integrated measurement value registrations (dose records) corresponding to the number of measurement intervals, i.e. to the number of LEDs, each registration representing the noise dose for the associated measurement interval. The respective noise doses may be subsequently established by determining the degree of darkening (after developing the film) on the respective portions of the film by comparison with known degrees of darkening, e.g. in a so-called densiometer.

A recording apparatus that is constructed in accordance with the known principles described above affords a number of advantages, such as: Permitting registration of measured quantity sequences having very short duration, e.g. sound impulses; Operation entirely without moving parts; Easily miniaturizable utilizing modern transducer and other circuit and electronics components, making it particularly well suited to applications for personal wear.

This known kind of registering apparatus has a clear disadvantage however, since the actual determination of an obtained measurement value is complicated, and requires densiometric equipment or other similar, advanced laboratory equipment.

OBJECT OF THE INVENITON

The object of the present invention is thus to provide a new, improved method of registration, of the kind mentioned in the introduction, by means of which said disadvantage is overcome, in that a direct reading of the obtained measurement value is enabled, other advantages also being gained such as excellent possibilties of adaptation to different registration requirements, and the possibility of accurate multi-interval registration, even in cases where greatly differing activities of quantities to be measured can be expected in the various measurement intervals.

SUMMARY OF THE INVENTION

The above-mentioned object is achieved in accordance with the invention by a method and apparatus being given the features set forth in the appended claims.

The invention thus means that the element detecting and integratingly recording the generated emission or radiation for every desired measurement value relatable to the measured quantity as such, or a given interval for the measured quantity value, is provided with a registration, the readable extension of which constitutes a directly determinable measure of the desired measurement value. In other words, the extent of the readable registration on the element increases according as the received integrated emission flow increases. The extension of the registration may be continuous or stepwise, with cohesive or separate zone parts or portions. Preferably, registration is made in the form of a bar, the readable extent of which (growing during a registration sequence) will be a direct measure of the recorded measurement value. The extension characteristic of the registration may be adapted to expected, measured quantity sequence, registration duration time, etc., and in principle it may be linear or logarithmic, for example.

According to one aspect of the invention, there is thus provided a registration method of the kind mentioned, distinguished in that the generated emission flow, preferably in response to the measured quantity value and particularly for a preselected measured quantity interval, is caused to affect a plurality of preferably continuous parts or portions of said element so that each portion is given a readable, partial registration when the appropriate portion has been subjected to an emission effect corresponding to a unique, integrated partial measurement value allotted to the portion, wherein, after a registration sequence, each part or portion having a readable partial registration indicates that at least an integrated measurement value corresponding to this part or portion has been recorded, the greatest readably, partial measurement value then representing a directly readable, integrated measurement value. It will be understood that in conjunction with principly continuously growing registration, the individual parts or portions will have very small or infinitesemal extension.

To advantage, the generated emission flow is caused to affect said element spread out, preferably in the form of a bar including said parts or portions, there being provided at emission influence a registration effect per unit of time, preferably a film darkening effect, which has a predetermined unique magnitude for each respective one of the various parts or portions of the emission-influenced zone of said element. It is suitable here to make the emission intensities incident on the various parts or portions of the emission affected or influenced zone of said element continuously or stepwise reduced in relation to each other and/or to use an element having different sensitivities to the emission which are continuously or stepwise reduced in relation to each other for the various portions of the zone affected by the emission. Preferably, by selective filtering of the emission flow, the flow is caused to strike with different intensities respective portions of the zone affected by emission on said element. It is also possible, however, to generate the emission flow such that it includes, per se, portions with different, suitable emission intensitites.

The method in accordance with the invention may also include giving the various portions of the emission-affected zone of said element different pre-registrations such as pre-irradiations, so that in conjunction with a registration process, each portion is given a readable partial registration for a particular emission effect, unique to that portion. It will be understood that pre-registration may be combined with one or more of the previously described measures.

According to another aspect of the invention, there is provided an apparatus for registering a time-dependent quantity to be measured, which is in the form of an electric signal, the apparatus comprising means for converting or transforming the electric signal to an emission or radiation flow, which is specifically allotted a measurement value registration, and preferably including means for controlling the conversion in response to the measured quantity value, particularly so that the conversion and therewith associated registration take place when said value is within a predetermined interval; an element having the ability of detecting and integratingly registering the emission in question, such as a photographic film; and emission control means for causing the emission flow generated by said conversion means to strike said detection and registration element for affecting it, so that the element is given an integrated measurement value registration corresponding to a time function of the measured quantity, such as an exposure dose, the apparatus being distinguished in that said conversion and emission control means are arranged to provide the incidence of said emission flow on a zone or area of said element, comprising a number of parts or portions preferably in the form of a bar, continuously merging into each other or stepwise cohesive, and in that means are arranged for causing the emission flow to strike with different intensities the respective portions of the emission-affected zone of said element and/or in that the portions of said zone of the element are arranged to have a unique limit value for the respective portion for the integrated emission effect required to give a readable partial registration on the respective portion. Said means providing different incident emission intensities include to advantage filter-means adapted for selectively moderating the portions of the generated emission flow incident on the respective portions of the emission-affected zone. Said filter means are here given an emission alternating characteristic adjusted to the emission intensity incident on the filter, the emission sensitivity of said element and expected recorded dose (i.e. expected total action time of the measured quantity) during a recording process, which may naturally embrace a period of time having greatly varying duration, e.g. from minutes to days, weeks or longer, according as the field of use.

For the purpose of providing the above-mentioned unique limit values, the various portions of the emission-affected zone suitably have different emission sensitivities. In the use of an element in the form of a photographic film, this has a suitably graded sensitivity in the various portions of the emission-affected zone. It is also possible to have an element, the various portions of which have been given different preregistrations, the portion first to have a readable registration (low measurement value) when emission-affected suitably having been given heavy preregistration and vice versa, i.e. the portion to have a readable registration for a large measurement value having been given slight, or no preregistration.

It will be understood that the invention is particularly well suited for utilization in dosimetric investigations, especially in conjunction with exposure to different physical and chemical agents in the working environment, where a simple, easily handled, miniaturised recording apparatus, which can be worn by a person is of great worth, as well as the possibility of rapid and simple reading of measurement values obtained. The invention is, however, generally usable in conjunction with data registration, where a time function of a measured quantity is required, e.g. in industrial process monitoring, long-term registration of climatic variables, recording speed-ometers, etc, above all where graphical display in a bar chart diagram is of interest.

BRIEF DESCRIPTION OF THE DRAWINGS

The invention will now be described by way of an exemplifying embodiment, while referring to the appended drawings containing four figures.

FIG. 1 very schematically illustrates the construction of an apparatus in accordance with the invention, the electrical part thereof being in block diagram form, while the main features of the emission generation and registration part are shown in perspective.

FIG. 2 schematically illustrates the construction of a level or measuring interval separator included in the block diagram of FIG. 1, as well as the emission generation and registration part, seen from above.

DETAILED DESCRIPTION OF EMBODIMENT

Figure 3:
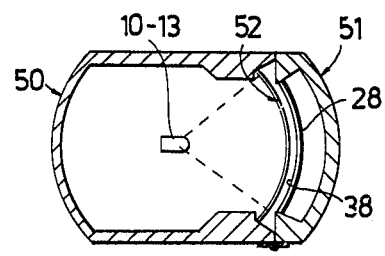
FIG. 3 is a schematic sectional view of an example of how the emission generation and registration components of the apparatus may be arranged in a casing.

The apparatus illustrated in FIGS. 1 and 2 is arranged for 4-channel registration in the form of a bar chart, which thus comprises four separately readable bar registrations. Three of the channels and their corresponding bars are intended for registering a measured quantity within three mutually separated measuring intervals, while the fourth channel is intended for pure time registration, i.e. registration of the total time for the registration sequence.

The apparatus includes a measurement signal transducer 1, for transmitting a measurement signal, the magnitude of which is dependent on the value of the measured quantity, to an amplifier 2. The amplified signal leaving the amplifier is applied to a level or measuring interval separator 3. Depending on whether the applied signal is greater than a first set value, but less than a second set value or lies between the second and a third set value or is greater than the third set value, said separator 3 emits a control signal respectively on a first output line 4, a second output line 5 or a third output line 6. Each of lines 4, 5 and 6 are connected to an associated respective driving stage 7, 8 and 9 for respective LEDs 10, 11 and 12. A fourth LED 13 is arranged to be driven by an associated driving stage 14.

Each of the units 1, 2, 3, 7, 8 and 9 are supplied with current via a line 15 when a power supply circuit 16 energising the apparatus is closed. The driving stage 14 is also supplied with current via line 15, but is further arranged to supply driving power to its associated LED 13 as soon as there is power on line 15. The driving stages 7,8 and 9, however, are arranged to give driving power to their respective LEDs only when they also receive a control signal on the respective line 4,5,6.

It will thus be understood that when the apparatus is energised, LED 13 emits radiation continuously, while only one of LEDS 10,11,12 emits radiation at a time, in response to the magnitude of the signal obtained from the measurement signal transducer 1.

Each of LEDs 10–13 is adapted for generating and emitting radiation having constant intensity. The emission or radiation flow 20,21,22 and 23, respectively, from the respective LED (only one of flows 20–22 is present at a time) is separated from the other radiation flows with the aid of suitable means 24–27, indicated in FIG. 2, but not more closely shown, and said flow is directed to an allotted zone of a film 28, of constant sensitivity to radiation, via a respective filter 30,31,32,33 and a respective aperture slit 34,35,36,37 in an aperture means 38 arranged between the film 28 and the LEDs. Each filter has a special attenuating characterisic, attenuating ability of the filter increasing vertically from bottom to top. A stepwise increase is assumed in the present case (the filter may be assumed to have five partial sections with constant attenuating ability in each section), although there could be a continuously logarithmically increasing attenuating ability, for example. Each LED will thus irradiate a bar-shaped zone on the film, the dose of irradiation received per time unit will be different for the five film zone portions or parts corresponding to the five partial sections of the associated filter, and it will be stepwise decreasing from the bottom and upwards.

The filters 30–33 preferably are "grey wedges" consisting of suitably shaded or darkened film (having stepwise increasing shading or darkening in the example). The filters will thereby be simple to manufacture and to arrange, while at the same time there is ensured very good reproduceability of the attenuating characteristics. Furthermore, it will be very simple to change filters in conjunction with a change in registration task.

The film 28 is suitably of the monochrome, fine-grain, high-constrast type, with low constant light sensitivity, so-called document film.

It will thus be understood that the height of the directly readable darkening or shading in the respective bar on the film, after a registration sequence (and subsequent developing), will be dependent on the time during which the LED of the associated channel or measuring interval has been energised so as to emit radiation, or in other words on the integrated measured quantity value of the measuring interval in question. Since the selected attenuation characteristic and film sensity of the filter are known, and with knowledge of previously produced calibration values, the readable bar height will be directly readable measure of the desired measurement value of the associated measuring interval. In respect of the time channel, the readable bar height obtained will naturally be, in a similar way, a directly readable measure of the total registration time, i.e. the time the apparatus has been energised. In conjunction with the use of miniature format film, reading off the height of the respective bar is suitably done with the aid of graduated measurement magnifier.

An example of how the level separator 3 may be made, will soon be described while referring to FIG. 2.

The separator 3 shown in this figure includes three threshold circuits 40,41,42, the inputs of which are connected to the output of amplifier 2 via associated, adjustable signal attenuating elements 43,44, and 45, respectively, shown here as simple potentiometers. The output of threshold circuit 40 is connected to driving stage 7 via a blocking circuit 46. Similarly threshold circuit 41 is connected to driving stage 8 via a blocking circuit 47. The output of threshold circuit 42 is connected directly to driving stage 9. The control input of blocking circuit 46 is connected to the output of threshold circuit 41. The control input of blocking circuit 47 is connected to the output of threshold circuit 42. The blocking circuits' function is to block signal passage when there is a signal on the respective control input.

Figure 4:
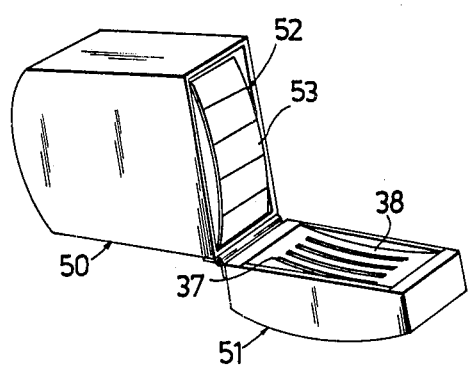
FIG. 4 illustrates in a schematic perspective view the arrangement of FIG. 3 with a film magazine part included therein in a swung-out position.

The threshold circuits' function is to emit a driving amplifier control signal from the respective output as long as the input signal on the respective input exceeds a given level. With suitable adjustment of elements 43–45, accordingly circuit 40 emits a signal when the signal supplied from amplifier 2 exceeds the above-mentioned first set value, circuit 41 emits a signal when the supplied signal exceeds the second set value, and circuit 42 emits a signal when the supplied signal exceeds the third set value. Blocking circuits 46,47 ensure that only the driving stage control signal, corresponding to the highest threshold function, is allowed to pass on to the associated driving stage. FIGS. 3 and 4 illustrate very schematically how the inventive apparatus may be arranged in a casing. This consists of two parts, namely a housing part 50, open on one side, and accommodating all the electric components and necessary filters, and a lid and film magazine part 51 closing off the housing part and containing the slit aperture 38 and film 28. This part 51 can be swung out and is removable. In the illustrated embodiment, the four filters 30–33 are combined into a single filter 52 having a width such that each of its transversely extending partial sections 53 cover all four parallel radiation channels. Filter 52 is arranged in the opening of housing part 50 for easy interchangeability and has an outwardly curved configuration. Aperture 38 is arranged in the opening of lid part 51 and is inwardly curved for matching with filter 52 in the closed position illustrated in FIG. 3. The film 28 is arranged behind aperture 38, the plane of the film having corresponding curvature. LEDs 10–13 are arranged in housing part 50, and centrally in relation to the curved film plane, so that the distance between film and diode is substantially the same for the entire film plane.

Although the invention has been described in more detail above by means of an example, in which a grey shading filter has been utilized to provide selective attenuation of the radiation, it is emphasized that the use of other filtering techniques is possible. Thus, registration on the film could be controlled using colour film technique (preferably ortho- or panchromatic) with filter functions provided by complementary colours giving different continuous or stepwise extinction curves. The emission or radiation signal which darkens or shades the film could also be regulated using a polarizing technique. Stepwise transmissivity differences may thus be provided in a filter containing polarizing filter portions having stepwise differing optical axis. In this case, the registration threshold (the sensitivity adapted to different input values/time duration fro the measurement) can also be varied mechanically by a rotatable polarizing filter in front of the LED.

If it is desired to have the registration result in clear showing, a transparent scale, possibly with numerical values, may be placed in the gap between filter and film. After the registration the scale then appears with its highest value corresponding to the highest shaded part of the filter and the result can be seen in a clear manner. A fixed scale may alternatively be pre-exposed on the film to one side of the bars.

A still further simplification may be obtained in the cases where it is possible to use a film of the Polaroid ® type, since the special development requirement would no longer be applicable. If such film of a larger format is used, after a registration sequence the measurement values of registrations obtained may be read off almost immediately, directly with the aid of a simple graduated ruler.

Further changes and modifications are, of course, possible within the scope of the invention, such as are defined by the following claims.

We claim:

1. A method of registering a time-dependent quantity to be measured, present in the form of an electric signal, said signal being transformed, in response to a preselected measured quantity value interval, into an emission flow, said emission acting on a recording element arranged to detect and to register said emission such that the element is thereby provided with a subsequently readable, integrated measurement value registration corresponding to a time function of the measured quantity, characterized in that the emission flow acts on several parts of said element with a spread-out distribution in the shape of a bar comprising said parts, such that each part is given a readable partial registration, when the part in question has been subjected to an emission effect providing a registering effect per time unit, which for the various parts of the zone of said element affected by emission has a predetermined magnitude unique to the respective part, wherewith, subsequent to registration process, each part having a readable partial registration indicates that there has been registered at least one integrated measurement value corresponding to said part, whereby the greatest partial measurement value represents a directly readable, integrated measurement value.

2. A method as claimed in claim 1, characterized by causing the emission intensities incident on the various parts of the zone of said element affected by said emission to be reduced in relation to each other.

3. A method as claimed in claim 2, characterized in that by selective filtering of the emission flow the latter is caused to be incident with different intensitites on respective parts of the zone of said element acted on by the emission.

4. The method of claim 2 wherein said reduction is provided by an element having different emission sensitivities corresponding to the various parts of the zone affected by emission.

5. A method as claimed in any one of the preceding claims, characterized by giving the various parts of said element different pre-registrations, so that in conjunction with a registration sequence, each part is given a readable partial registration for a particular emission effect, unique to the part in question.

6. Apparatus for registering a time-dependent quantity to be measured, present in the form of an electric signal, said apparatus comprising conversion means for converting the electric signal to an emission flow which is specifically allotted a measurement value registration, including means for controlling the conversion in response to the measured quantity value so that conversion and registration in conjunction therewith take place when the measured quantity value is within a predetermined interval; an element for detecting and intergratingly registering the emission in question; and emission control means for causing the emission flow generated by said conversion means to be incident on said detecting and registering element for affecting said element, such that it is given an integrated measurement value registration corresponding to a time function of the measured quantity value, the apparatus being characterized in that said conversion and emission control means provide the incidence of said emission flow on a zone of said element, said zone consisting of a number of parts in the form of a bar; and filter means arranged selectively to dampen the emission flow portions associated with the respective parts of the zone acted on by the emission for causing the emission flow to be incident with different intensities on respective parts of the emission-affected zone of said element for giving a readable partial registration for the part in question.

7. Apparatus as claimed in claim 6, characterized in that the various parts of the zone affected by the emission have different emission sensitivities.

8. Apparatus as claimed in claim 6 or 7, characterized in that the various parts of the zone affected by emission have different preregistrations.

* * * * *